United States Patent [19]

Hall et al.

[11] Patent Number: 5,468,050
[45] Date of Patent: Nov. 21, 1995

[54] VEHICLE SEAT ASSEMBLY WITH UNITARY FRAME STRUCTURE

[75] Inventors: Jack K. Hall, New Hudson; John B. Delphia, White Lake, both of Mich.

[73] Assignee: Hoover Universal, Inc., Plymouth, Mich.

[21] Appl. No.: 181,297

[22] Filed: Jan. 13, 1994

[51] Int. Cl.⁶ .................................................. A47C 1/02
[52] U.S. Cl. ................................ 297/344; 297/452.18
[58] Field of Search .......................... 297/344.1, 383, 297/452, 18; 248/430; 296/65.1

[56] References Cited

U.S. PATENT DOCUMENTS

| | | | |
|---|---|---|---|
| 3,938,771 | 2/1976 | Urai | 297/344.1 X |
| 4,570,997 | 2/1986 | Tanizaki et al. | 297/344.1 X |
| 4,597,552 | 7/1986 | Nishino | 297/344.1 X |
| 4,673,215 | 6/1987 | Yokoyama | 297/452.18 |
| 4,817,904 | 4/1989 | Munakata et al. | 297/344.1 X |
| 4,889,379 | 12/1989 | Aso . | |
| 5,240,310 | 8/1993 | Rink | 297/452.18 |

*Primary Examiner*—Laurie K. Cranmer
*Attorney, Agent, or Firm*—Harness, Dickey & Pierce

[57] ABSTRACT

A vehicle seat assembly having a support member extending laterally across the seat assembly and coupled to slide rails on each side forming a unitary frame structure movable upon fixed rails mounted to the motor vehicle. The unitary frame structure forms a platform upon which the seat cushion and seat back are mounted. By extending the unitary frame member outward beyond the sides of the seat cushion, the unitary frame structure can be mounted to the raised sill and tunnel of the vehicle body, above the floor. Alternatively, the unitary frame structure can be mounted vertically into the floor gaining the same benefits. This increases the space beneath the seat assembly which can be used by a rear seat occupant for his or her feet or for storage of other items.

10 Claims, 3 Drawing Sheets

VEHICLE SEAT ASSEMBLY WITH UNITARY FRAME STRUCTURE

BACKGROUND AND SUMMARY OF THE INVENTION

The present invention relates to a vehicle seat assembly and in particular to a seat assembly having a unitary frame structure spanning laterally between the two fore and aft slide tracks. The seat cushion and seat back are mounted upon the unitary frame structure.

Vehicle seat assemblies for a front seat of a motor vehicle are typically constructed with a pair of fore and aft extending slide tracks, one slide track at each side of the seat assembly. Each slide track includes a fixed rail attached to the vehicle body and a slide rail, movable fore and aft upon the fixed rail. The slide rails typically include an upwardly projecting riser to which the seat cushion and seat back are attached. There is typically no structural connection between the two slide rails other than that provided by the attachment of the seat cushion and seat back to both of the slide rails. With such a structure, it is possible for "matchboxing" to occur where one slide rail moves forward relative to the other slide rail, causing the two slide tracks to bind up. To prevent the occurrence of matchboxing, power seat adjusters are usually provided with two drive screws, one along each slide track, to ensure that both slide rails are moved fore and aft simultaneously.

It is one object of the present invention to provide a seat assembly in which the two slide rails are structurally coupled to one another forming a unitary frame structure upon which the seat cushion and seat back are mounted. This ensures the alignment of the two slide rails, preventing the occurrence of matchboxing and provides improved structural characteristics to the entire seat assembly.

The seat assembly of the present invention includes a generally rectangular support member having side edges along which the slide rails are attached to form a unitary frame structure. The frame structure is moved fore and aft upon a pair of fixed rails which are configured to be attached to a vehicle body and carry the slide rails. The seat cushion and seat back of the seat assembly are attached to the unitary frame structure.

The use of a support member spanning laterally between slide tracks provides the seat designer with flexibility in the lateral location of the slide tracks. The slide tracks no longer need to be located near the side edges of the seat cushion. For example, the slide tracks can be moved outward, beyond the edges of the seat cushion. By moving the slide tracks outward, they can be attached to a raised door sill and to the raised tunnel at the center of the vehicle body instead of being mounted to the floor. Such a sill and tunnel mounting of the seat assembly can provide increased foot room under the seat assembly for a rear seat vehicle occupant or other seat assembly adjustment mechanisms. In addition, a unique styling for the vehicle interior can be produced.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
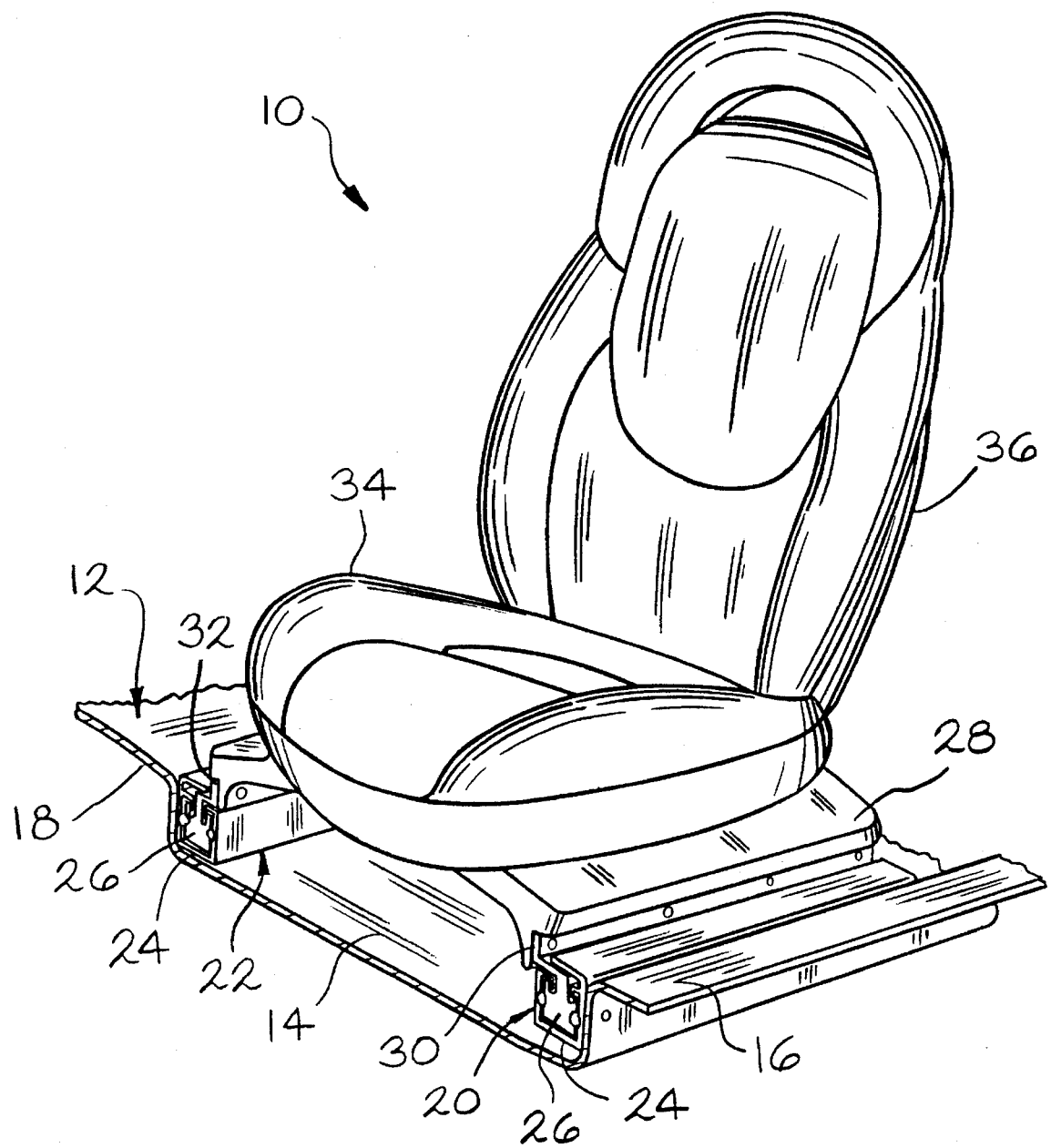
FIG. 1 is a perspective view of the seat assembly of the present invention shown installed in a vehicle body.

The seat assembly of the present invention is shown in FIG. 1 and designated generally at 10. Seat assembly 10 is shown mounted to a motor vehicle body 12. The body 12 includes a lower floor 14, a raised door sill 16 along the outboard side of the vehicle body and a raised tunnel 18 extending fore and aft along the center of the vehicle body.

Seat assembly 10 includes a pair of slide tracks 20 and 22 with one slide track extending fore and aft along each lateral side of the seat assembly. The slide tracks provide for fore and aft adjustment of the seat position relative to the vehicle as described in greater detail below. Each slide track includes a fixed rail 24 adapted to be mounted to the sill or tunnel of the vehicle body by bolts 25 or other fasteners. The slide tracks also include a sliding rail 26 which is carried by the fixed rails for fore and aft sliding motion relative to the fixed rails. Bearings, not shown, are provided to facilitate the movement of the slide rails as is conventional in automotive seat slide tracks.

A support member 28 spans laterally between the two slide rails 26. The slide rails are fixed to the side edges 30 and 32 of member 28 by bolts, rivets, etc., not shown. The slide rails and support member 28 form a rigid, unitary frame structure for the seat assembly. By forming the slide rails and support member 28 as a unitary frame structure, there is no possibility for "matchboxing" of the slide rails because they must both move fore and aft together with the support member 28. A horizontal seat cushion 34 and a generally upright seat back 36 are mounted to the support member 28.

Figure 2:
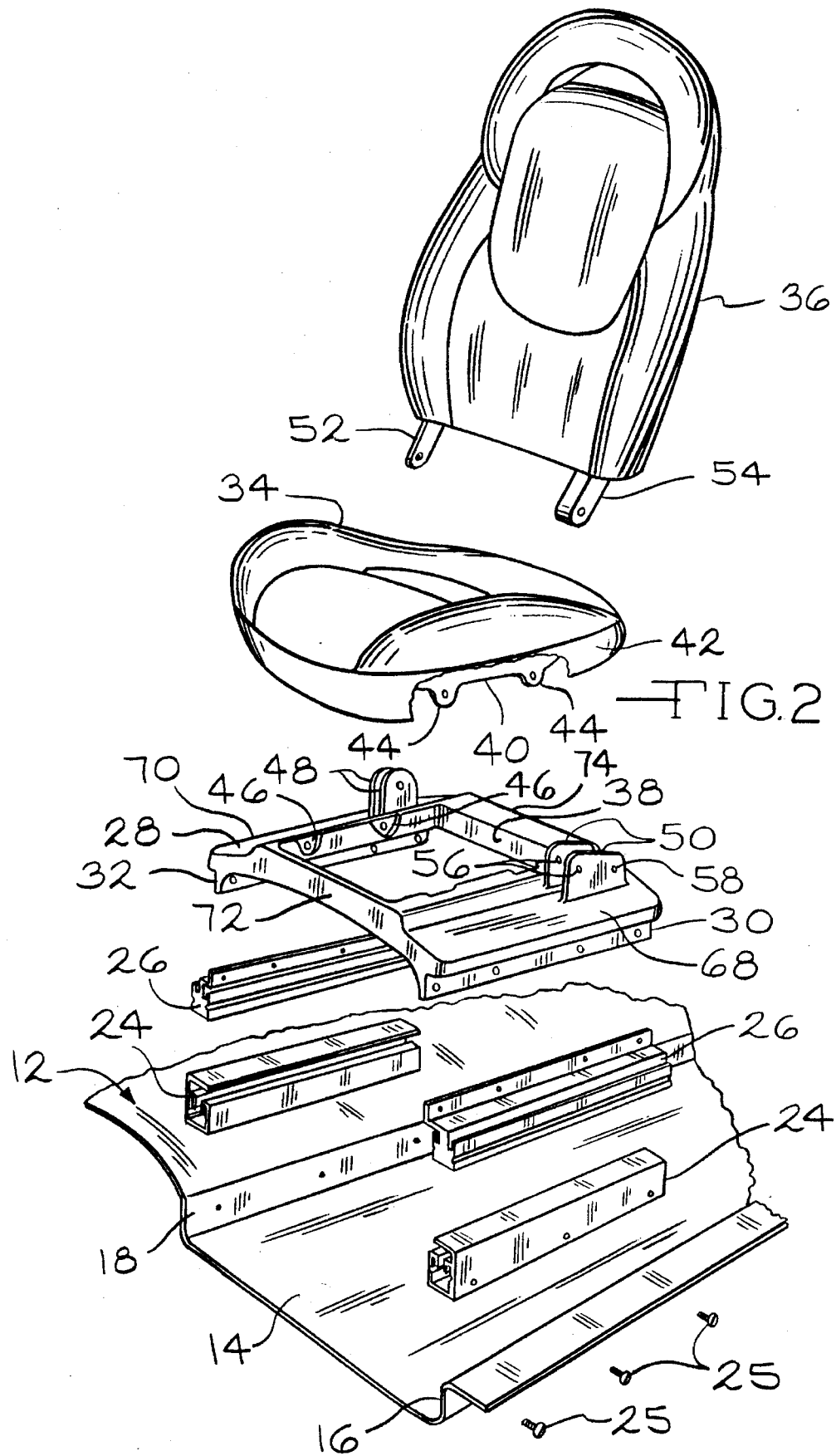
FIG. 2 is an exploded perspective view of the seat assembly of the present invention.

With reference to FIG. 2, the support member 28 is shown in greater detail. Support member 28 is generally arched upwardly between its two side edges 30 and 32 forming a raised dome above the floor portion 14. The support member 28 is generally rectangular, having a central vertical opening 38. The central opening 38 is primarily for weight reduction by eliminating the structure where it is not needed. Support member 28 can be made with other vertical openings if necessary for seat adjustment mechanisms, etc. With the central opening, the support member 28 can generally be characterized as having spaced side portions 68 and 70 with front and rear cross members 72 and 74 respectively. The support member produces a strong, rigid support for the cushion and seat back. This is especially useful in a seat assembly incorporating a belt restraint system with the seat assembly carrying the belt loads.

The seat cushion 34 includes an internal frame 40 which is substantially surrounded by a foam pad and an upholstery cover 42. The seat cushion frame 40 includes mounting bosses 44 for attachment of the seat cushion to the support member 28 at the corresponding mounting bosses 46 in the support member.

Seat back 36 has a frame with depending legs 52 and 54. These legs are attached to the support member 28 by the raised mounting flanges 48 and 50 extending upwardly, near the rear of the support member 28. Leg 54 of the seat back frame is coupled to the mounting flanges 50 through the frontmost apertures 56 in the flanges. The rear apertures 58 in the mounting flanges 50 are used for coupling a seat back recliner (not shown) to the support member 28.

Various adjustment mechanisms can be included in the seat assembly. For example, the seat cushion can be mounted to the support member by lift levers that enable the cushion height to be adjusted. A seat back recliner can also be provided. A fore and aft seat adjuster will be included to lock the slide rails in position on the fixed rails. Various forms of such mechanisms can be used with the support member 28.

The support member 28 is shown in FIG. 1 extending between the door sill 16 and the tunnel 18 of the vehicle body. This places the slide tracks further outward relative to the seat cushion 34 then is typically the case for the slide tracks in most prior art seat assemblies. This increases the space beneath the seat assembly 10. This space can be used as foot room for a rear seat occupant, for seat adjustment components or for other vehicle components unrelated to the seat assembly. However, it will be appreciated by those skilled in the art that the unitary frame structure comprising the slide rails and support member can be employed with slide tracks that are attached to the floor 14 rather than to the sill and tunnel of the vehicle body.

The support member 28 can be made by a variety of manufacturing methods including structural plastic molding, epoxy or fiberglass reinforced resin molding or light weight metal die casting with aluminum or magnesium, etc. In addition, the support member can be made of a metal stamping or welded sheet metal assembly. Plastic molding or metal die casting are preferred methods for inexpensively manufacturing a support member of irregular shape as compared to a welded sheet metal assembly.

Figure 3:
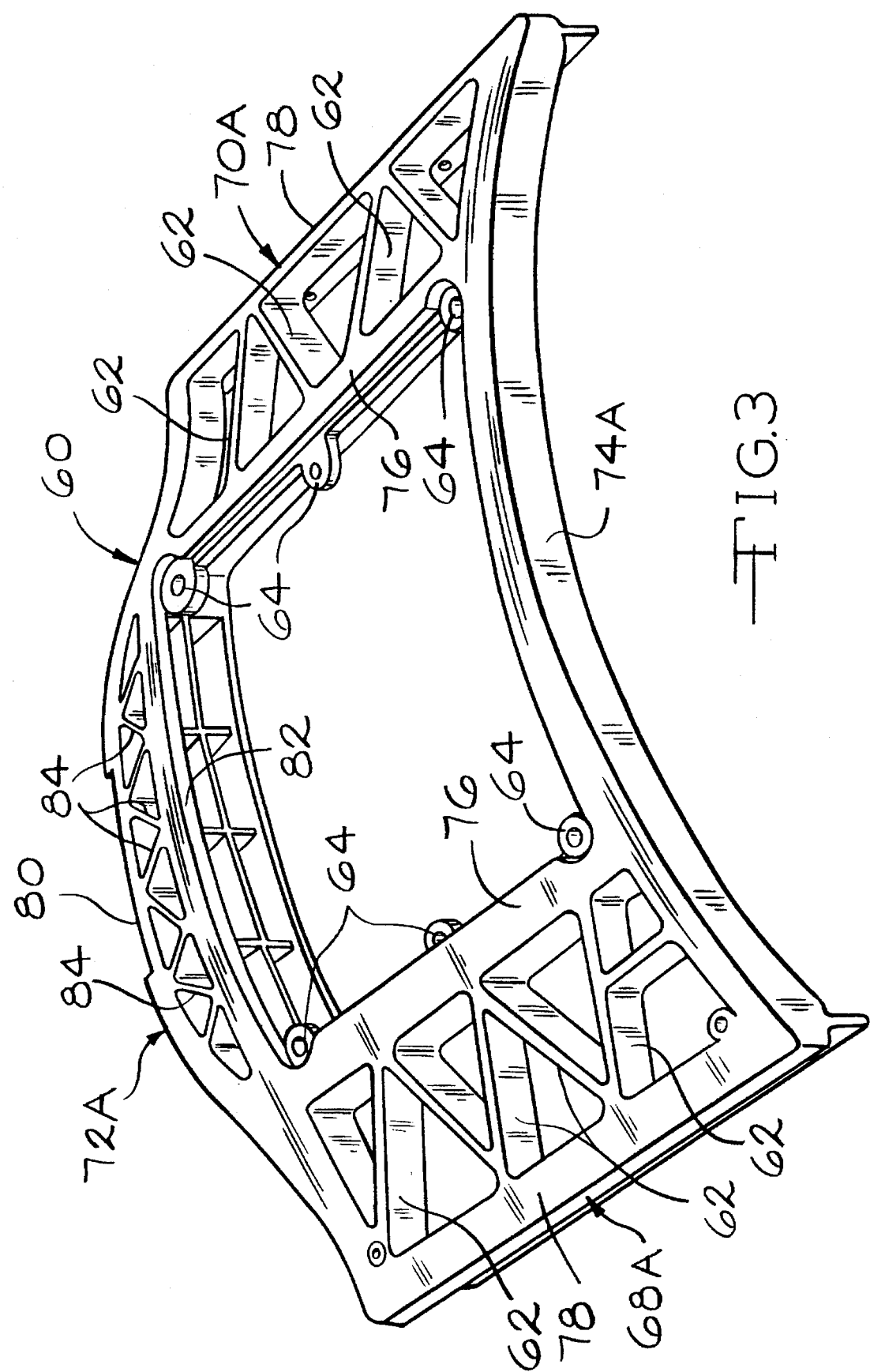
FIG. 3 is a perspective view of an alternative embodiment of the support member.

With reference to FIG. 3, an alternative embodiment of the support member is shown and designated generally at 60. The support member 60 is a light weight cast or molded body constructed with a plurality of webs. The side portions 68A and 70A are of an open, web construction having inner and outer sections 76 and 78 respectively connected by the webs 62. Front cross member 72A is likewise constructed of front and rear sections 80 and 82 respectively connected by webs 84. The support member 60 includes mounting bosses 64 for attaching the seat cushion and seat back. The support member 60 can be covered with an upholstery cover if desired for matching the interior trim of the motor vehicle or the webs can remain exposed for styling purposes.

The unitary frame structure has been shown and described as an assembly of the support member 28 and the slide rails 26. This is to facilitate manufacturing of the unitary frame structure. Different manufacturing methods are used to make the support member and slide rails so that each component is made in the most efficient manner. As new production techniques are developed, it may be possible to produce the unitary frame structure as a single component. The invention, a vehicle seat assembly having a unitary frame structure spanning between the slide tracks, can be employed with any number of parts assembled to form the unitary frame structure. The invention is not limited to a frame structure with three components as shown, a support member and two slide rails, joined together.

The seat assembly of the present invention provides a unitary frame structure for the seat cushion and seat back mounted upon fore and aft extending rails attached to a vehicle body. The result is a strong frame structure for the seat cushion and seat back. In addition, the possibility of "matchboxing" of the seat frame on the fixed rails is prevented. When used with a sill and tunnel mounting of the fixed rails, increased space is provided beneath the seat assembly.

It is to be understood that the invention is not limited to the exact construction illustrated and described above, but that various changes and modifications may be made without departing from the spirit and scope of the invention as defined in the following claims.

We claim:

1. A seat assembly for a motor vehicle having a body, said seat assembly comprising:

a pair of fixed rails extending fore and aft and being laterally spaced from one another, said fixed rails being adapted to be mounted to the vehicle body;

a pair of slide rails extending fore and aft and being laterally spaced from one another, said slide rails being carried by said fixed rails for fore and aft sliding movement relative to said fixed rails;

a support member having laterally spaced side edges, said support member being fixed to said slide rails along said side edges forming a unitary frame structure whereby said unitary frame structure is movable fore and aft relative to said fixed rails;

a generally horizontal seat cushion having spaced lateral sides mounted upon said unitary frame structure; and a generally upright seat back mounted upon said unitary frame structure and extending upwardly therefrom;

said unitary frame structure extending outwardly beyond said lateral sides of said seat cushion to said side edges and said slide rails.

2. The seat assembly of claim 1 wherein said support member has a pair of spaced side portions forming said laterally spaced side edges, said side portions have inner and outer sections connected together by a plurality of webs.

3. The seat assembly of claim 2 wherein said support member comprises front and rear spaced cross members connected to said side portions forming a generally rectangular body when viewed from above, said front cross member including front and rear sections connected together by a plurality of webs.

4. The seat assembly of claim 1 wherein said unitary frame structure is arched upwardly between said side edges forming a raised dome structure above said side edges.

5. The seat assembly of claim 1 wherein said support member is a single piece molded plastic member spanning between said slide rails.

6. The seat assembly of claim 1 wherein said support member is a single piece cast metal member spanning between said slide rails.

7. In a motor vehicle, a vehicle body having a lower floor with laterally spaced sides, a raised sill along one of said sides of said floor and a raised tunnel along the other of said sides of said floor;

a pair of fixed rails extending fore and aft and being laterally spaced from one another, one of said fixed rails being adapted to be mounted directly to and solely supported by said raised sill of the vehicle body and to be spaced above said floor and the other of said fixed rails being adapted to be mounted directly to and solely supported by said raised tunnel of the vehicle body and to be spaced above said floor;

a pair of slide rails extending fore and aft and being laterally spaced from one another, said slide rails being carried by said fixed rails for fore and aft sliding movement relative to said fixed rails;

a generally horizontal seat cushion having spaced lateral sides and a rear end and a generally upright seat back extending upwardly at the rear end of said seat cushion; and means for mounting said seat cushion and said seat back to said slide rails.

8. The seat assembly of claim 7 wherein said means for mounting said seat cushion and said seat back to said slide rails includes a support member having spaced side edges and being fixed to said slide rails along said side ledges and spanning between said slide rails above the floor, said support member and said slide rails forming a unitary frame structure with said seat cushion and said seat back being mounted to said unitary frame structure above the floor.

9. The seat assembly of claim 8 wherein said unitary frame structure extends outwardly beyond said lateral sides of said seat cushion to said side edges and said slide rails.

10. The seat assembly of claim 8 wherein said unitary frame structure is arched upwardly between said side edges forming a raised dome structure upon which said seat cushion is mounted.

* * * * *